M. SKRETTING.
FLAG HOLDER.
APPLICATION FILED JUNE 4, 1918.
1,296,866. Patented Mar. 11, 1919.
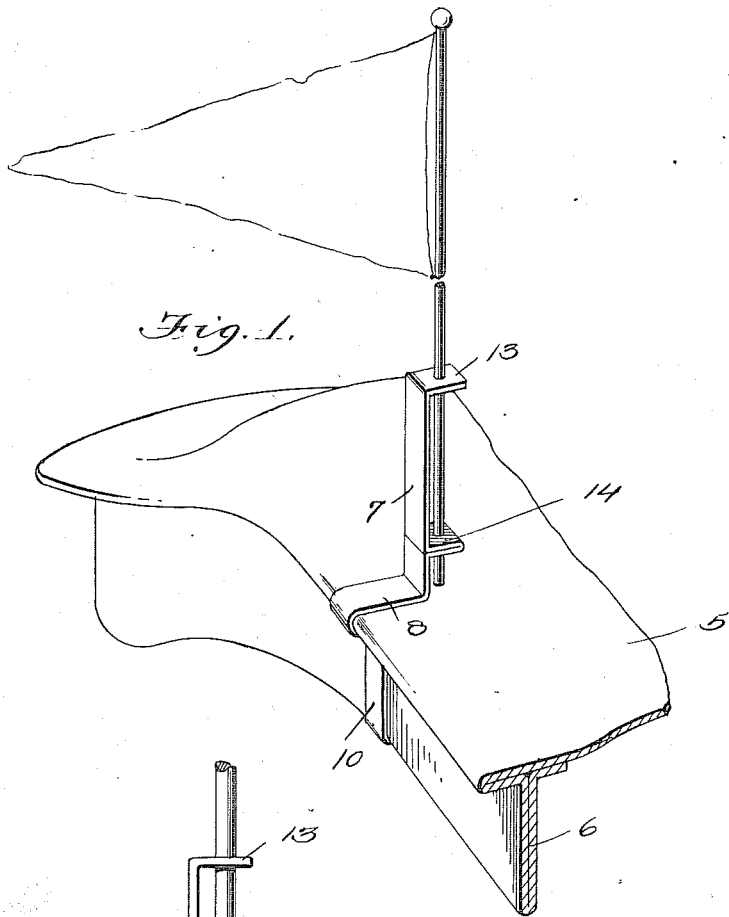
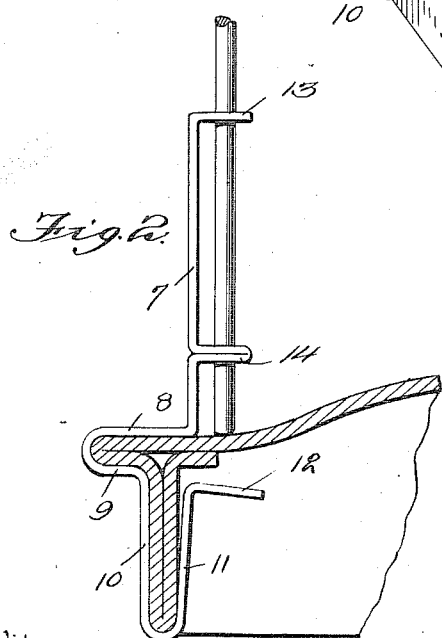
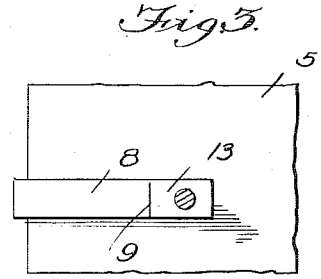

UNITED STATES PATENT OFFICE.

MARTIN SKRETTING, OF OPSTEAD, MINNESOTA.

FLAG-HOLDER.

1,296,866.  Specification of Letters Patent.  Patented Mar. 11, 1919.

Application filed June 4, 1918. Serial No. 238,147.

*To all whom it may concern:*

Be it known that I, MARTIN SKRETTING, a citizen of the United States, residing at Opstead, in the county of Millelacs, State of Minnesota, have invented certain new and useful Improvements in Flag-Holders; and I do hereby declare the following to be a full, clear, and exact description of the invention, such as will enable others skilled in the art to which it appertains to make and use the same.

The present invention relates to new and useful improvements in supporting devices for flag poles or other cylindrical members.

It is the object of the present invention to provide such a supporting device which may be detachably mounted upon the fender of an automobile, to support a flag pole in upstanding position on said fender, and which may be connected with the fender in a secure manner without necessitating the use of bolts or like securing means, whereby to permit a most ready attachment or detachment of the device and to avoid the necessity of providing bolt holes in the mud guard.

A further object resides in the provision of such a supporting device which is of exceedingly simple construction whereby to permit a minimum cost of manufacture.

With the above and other objects and advantages in view, the invention resides more particularly in the novel combination, formation and arrangement of parts hereinafter described and particularly pointed out in the appended claims.

In the drawings:

Figure 1 is a perspective view showing the improved device attached to the fender of an automobile, and supporting a flag thereon.

Fig. 2 is an elevational view of the device, with the adjacent fender portion to which it is attached shown in section.

Fig. 3 is a plan view of the device mounted on a fender.

Referring now more particularly to the drawings, there is shown a portion of a mud guard or fender plate 5, of the type conventionally found on automobile structures, said plate being arched both longitudinally and transversely to conform to the periphery of the wheel over which it is positioned, and including horizontally projected side edge portions having brace flanges 6 depending therefrom and spaced slightly inwardly from the edges of the plate.

The improved flag holder is preferably formed from a single length of a spring metal, and this length of metal is bent at intermediate portions forming a standard 7 and a seating edge or shoulder 8 extending at substantially a right angle from the standard and adapted to rest transversely on a horizontal outer edge portion of the fender plate. From the outer end of the shoulder 8 the metal is bent inwardly at 9 to underlie the fender edge portion outwardly of the flange 6 and is then bent downwardly at 10 and about the flange, and upwardly at 11 at the inner side of the flange, and terminates in a finger portion 12 extended outwardly from the U formed by the portions 10 and 11, this portion 12 lying in the angle formed by the flange 6 and the fender plate portion inwardly thereof.

By the foregoing arrangement, both the pairs of metal strip portions 8 and 9 and 10 and 11 will frictionally engage the fender structure due to the resilience of the strip, and this frictional engagement will serve to efficiently hold the device on the fender against accidental displacement incidental to the jarring action which would be set up in travel of the automobile. The device is attached to or removed from the fender by grasping the standard portion 11 and the finger portion 12 and springing the intermediate portions apart to clear the edges of the fender and its flange.

The standard 7, at its upper end, is bent laterally at 13 and apertured to receive the shank or pole of a flag or banner, and to afford a second holding means for the shank, the material forming the standard is provided with a double bend 14 adjacent its lower portion also apertured to receive the pole or shank, which rests at its lower end on the fender.

An exceedingly simple device has thus been provided which will efficiently support a flag or the like in a prominent position on the fender of an automobile, and which may be instantly attached or removed.

What is claimed is:—

1. A flag holder for attachment to a fender comprising a single length of spring metal provided with an intermediate bend forming a standard and a seating shoulder, said length of metal being further bent at one side of the first bend to embrace and resiliently grip the fender, and bent at the other side of the first bend to form means for securing a flag pole to the standard.

2. A flag holder for attachment to a fender comprising a single length of spring metal provided with an intermediate bend forming a standard and a seating shoulder, said length of metal being bent inwardly from said shoulder and then bent outwardly from said shoulder in U shape to embrace the flange of the fender and the metal forming said standard being bent for the securement of a flagpole to said standard.

In testimony whereof, I affix my signature, in the presence of two witnesses.

MARTIN SKRETTING.

Witnesses:
HELMIK SKRETTING,
N. J. OREDSON.